Sept. 11, 1928.  
E. SCHÜRER  
1,684,363  
LEAD SHEATHED TELEPHONE CABLE  
Filed Nov. 26, 1927

E. Schürer  
INVENTOR

Patented Sept. 11, 1928.

1,684,363

UNITED STATES PATENT OFFICE.

EUGEN SCHÜRER, OF COLOGNE-MULHEIM, GERMANY, ASSIGNOR TO FELTEN & GUILLEAUME CARLSWERK ACTIEN-GESELLSCHAFT, OF COLOGNE-MULHEIM, GERMANY.

LEAD-SHEATHED TELEPHONE CABLE.

Application filed November 26, 1927, Serial No. 235,891, and in Germany November 27, 1926.

It has already been proposed to surround the conductors, pairs of conductors, quads or groups of conductors of lead sheathed telephone cables with metallic covers for reducing mutual inductive action. These metallic covers were mostly either not connected at all to the lead sheath or only at the beginning or end of the manufactured lengths of cable, the core of the cable being separated from the lead cover by a paper or strip wrapping for protecting the conductors and covers from damage when the lead sheath is being pressed round them. Hitherto, however, telephone cables with such covers have not always shown the desired freedom from cross talking, more particularly when high degrees of amplification are being used, as is for instance the case with cables which are used for the transmission of music. It has been found that very good results are obtained when provision is made for securing a continuous connection between the metallic covers and the lead sheath, as by this means the conductivity of the covers is effectively assisted by that of the lead sheath. In making a continuous connection of the metallic covers, however, special difficulties are met with, owing to the fact that the covers and conductors easily become damaged when the lead sheath is being pressed round the same.

In order to avoid such damage, according to the present invention the core of the cable consisting of conductors with electrically conductiing covers is wrapped, before the lead sheath is pressed round, with a muslin band having metallic threads running through it, the use of which is known in connection with power cables. Such a muslin band embodying metallic threads both prevents the conductors being damaged when the lead sheath is being applied and ensures an intimate metallic connection between the metallic covers and the lead sheath.

Figure 1:
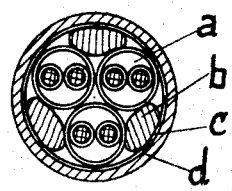
Figure 2:
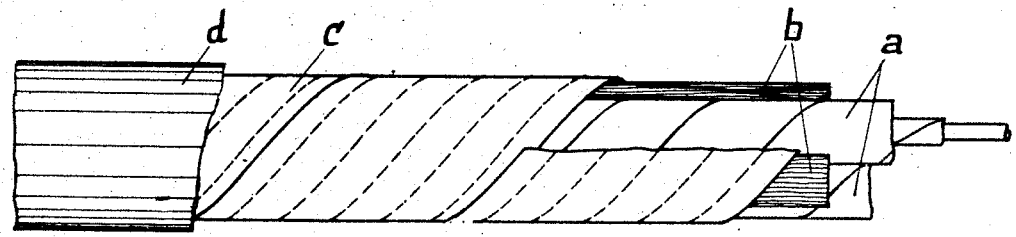

Figs. 1 and 2 show in cross-section and elevation a constructional example of a telephone cable according to the present invention. *a* are the conductors provided with metallic covers, *b* the insertions for filling up hollow spaces and *c* is the muslin band having metallic threads running through it, which is for instance wrapped around stranded double conductors enveloped in metalized paper. Over the muslin band with the metallic threads lies the lead sheath.

What I claim is:

A telephone cable comprising in combination a core containing electric conductors and electrically conducting covers on the said conductors, a lead sheath for the said core and a wrapping of muslin band having metallic threads running through it between the core and the lead sheath, as and for the purpose set forth.

In testimony whereof I have signed my name to this specification.

EUGEN SCHÜRER,